US012791371B2

(12) United States Patent
Arellano et al.

(10) Patent No.: US 12,791,371 B2
(45) Date of Patent: Nov. 10, 2026

(54) VIRTUAL FLOW RATE TEST

(71) Applicant: Chevron U.S.A. Inc., San Ramon, CA (US)

(72) Inventors: Jose Luis Mejia Arellano, Houston, TX (US); Gonzalo Alberto Garcia Chaparro, Katy, TX (US); Gabriel Diaz Hernandez, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 993 days.

(21) Appl. No.: 18/145,740

(22) Filed: Dec. 22, 2022

(65) Prior Publication Data

US 2023/0194320 A1 Jun. 22, 2023

Related U.S. Application Data

(60) Provisional application No. 63/292,826, filed on Dec. 22, 2021.

(51) Int. Cl.
*G01F 1/696* (2006.01)
*E21B 43/24* (2006.01)

(52) U.S. Cl.
CPC .............. *G01F 1/696* (2013.01); *E21B 43/24* (2013.01)

(58) Field of Classification Search
CPC ....................................................... G01F 1/696
USPC ........................................................... 703/10
See application file for complete search history.

(56) References Cited

U.S. PATENT DOCUMENTS

| | | | | |
|---|---|---|---|---|
| 6,182,756 | B1 | 2/2001 | Garcia et al. | |
| 8,788,209 | B2 * | 7/2014 | Foot | E21B 47/06 702/12 |
| 2003/0079912 | A1 * | 5/2003 | Leuchtenberg | E21B 44/00 175/48 |
| 2009/0105969 | A1 * | 4/2009 | Saylor | G01F 1/684 702/45 |
| 2009/0166035 | A1 * | 7/2009 | Almaguer | E21B 47/09 166/255.2 |

OTHER PUBLICATIONS

Ramey_1962 (Society of Petroleum Engineers, Mar. 6, 1962 36th Annual Fall Meeting of SPE Oct. 8-11, Dallas Texas) (Year: 1962).*
Tattersall_2021 (Thermimage: Thermal Image Analysis, Sep. 27, 2021). (Year: 2021).*
FluidFlow_2021 (Heat Transfer in Pipes and Using FluidFlow to Understand these Effect, Piping Systems & Hydraulics, Aug. 17, 2021): (Year: 2021).*
STOLI_2021 (How to Calculate Heat Transfer in Continuous Flow Application, Sep. 24, 2021 STOLICCHEM.com): (Year: 2021).*

* cited by examiner

*Primary Examiner* — Brian S Cook
(74) *Attorney, Agent, or Firm* — King & Spalding LLP

(57) ABSTRACT

A system and method of estimating a flow rate through a pipe using thermodynamics. The flow rates are estimated by using fluid properties, reservoir properties, pump properties, and heat transfer properties. Additionally, historical well data can be used to create a model that is used to estimate flow rate through a pipe.

13 Claims, 4 Drawing Sheets

VIRTUAL FLOW RATE TEST

RELATED APPLICATIONS

The present application claims priority to U.S. Provisional Patent Application No. 63/292,826, filed Dec. 22, 2021, the entire content of which is incorporated herein by reference.

TECHNICAL FIELD

The present disclosure is generally related to the production of fluids from a well and, more particularly, to a well testing apparatus and a method of well testing. The well testing apparatus and method of well testing estimate the flow rate within a pipe.

BACKGROUND

Wells in the oil and gas industry are monitored in order to measure the properties of the well (e.g., flow rate, fluid composition, pressure and temperature) and to assess the performance of the wells. These monitor tests help to determine the properties of the wells such as gas-oil ratio, water cut, productivity, and reservoir properties. Well tests can be performed continually or on a regular basis in order to monitor well performance and to meet regulatory requirements.

Examples of flow rate test equipment include flowmeter systems which use turbines to measure the flow rate. Thermocouples have also been installed in pipes which measure the temperature of the flowing fluid and then use mass and momentum equations (under steady state conditions), and the differential pressure and boundary conditions to calculate the flow rate. Flow rates are occasionally estimated using a gas-liquid separator (rate estimated with discharge number per unit time), pipe or choke pressure drop correlations or a flow performance curve (pressure vs. flow rate). Current methods of measuring flow rate require equipment be built into a pipe such as a flow meter, a thermocouple, or installation of separators in order to measure the flow rate.

SUMMARY

An embodiment of the disclosure is a method to estimate a flow rate of a fluid in a pipe, the method comprising: obtaining data related to a temperature of the pipe and a temperature of an environment surrounding the pipe; obtaining data related to well properties, fluid properties, heat transfer, and pump properties; calculating a flow rate of fluid through the pipe using a thermodynamic equation as follows:

$$Q = \beta\left(\acute{U} * \Delta T\right)$$

wherein Q is the flow rate to be calculated; β is derived from the data related to well properties, fluid properties, heat transfer, and pump properties; ΔT is derived from a thermal photograph; and Ú is a heat transfer coefficient. In some embodiments the data related to the temperature of the pipe is obtained from a thermal photograph, and in specific embodiments, the thermal photograph is obtained from a thermal camera. The data related to the temperature of the area surrounding the pipe can also be obtained from a thermal photograph, which can be obtained from a thermal camera. In some embodiments, the pipe is fluidly connected to a wellhead, and in some embodiments, a pump is fluidly connected to the pipe. In specific embodiments, the thermodynamic equation is further specified as $$Qo = \frac{ANP * \phi 2}{L + (\blacktriangle P)} \times \frac{Gor * {}^{\circ}API * Wc}{\mu o} \times \frac{\mathring{U} * \blacktriangle T}{\omega} \times \frac{AT * Whp}{PIP}$$

where: ANP is reservoir net pay, Ø is porosity, L is depth, ▲P is wellbore pressure drop, GOR is gas oil ratio, API is oil specific gravity, WC is water cut, μo is oil viscosity, ω is field factor, AT is differential temperature, WHP is wellhead pressure, and PIP is pump intake pressure. In a specific embodiment, ω is equal to βo+S. In some embodiments, ω is calculated from information obtained from multiple wells. In a specific embodiment, ω is equal to βo+S. In some embodiments, ω is calculated from information obtained from multiple wells. In some embodiments a plurality of flow rates are calculated at a plurality of well sites and the flow rates are overlaid on a map at locations corresponding to each well site location the map being displayed by the computing system. In embodiments a warning based on the flow rate is displayed to a user through a graphical user interface. In some embodiments wherein based on the flow rate, a rpm is adjusted for the pump. In embodiments, wherein based on the flow rate, a rate of water or steam injected into a wellhead is adjusted.

Another embodiment of the disclosure is a computer system comprising: a processor; a memory; and a flow rate estimation algorithm stored in the memory and configured to execute a flow rate estimation model on the processor, the flow rate estimation model comprising: a first input node configured to obtain data related to a temperature of a pipe and a temperature of an environment surrounding the pipe; a second input node configured to obtain data related to well properties, fluid properties, heat transfer, and pump properties; a calculation node configured to calculate a flow rate value of fluid through the pipe using a thermodynamic equation as follows:

$$Q = \beta\left(\acute{U} * \Delta T\right)$$

wherein Q is the flow rate to be calculated; β is derived from the data related to well properties, fluid properties, heat transfer, and pump properties; ΔT is derived from a thermal photograph; and Ú is a heat transfer coefficient; and, an output node configured to provide the flow rate value. In embodiments, the first input node is configured to parse a thermal photograph and return the temperature of the pipe and the temperature of the environment surrounding the pipe. In some embodiments, the data related to the temperature of the pipe is obtained from a thermal photograph and in specific embodiments, the thermal photograph is obtained from a thermal camera. In some embodiments, the data related to the temperature of the area surrounding the pipe is obtained from a thermal photograph. In some embodiments, the pipe is fluidly connected to a wellhead and in some embodiments a pump is fluidly connected to the pipe. In a specific embodiment, the thermodynamic equation is further specified as $$Qo = \frac{ANP * \phi 2}{L + (\blacktriangle P)} \times \frac{Gor * {}^{\circ}API * Wc}{\mu o} \times \frac{\mathring{U} * \blacktriangle T}{\omega} \times \frac{AT * Whp}{PIP}$$

where: ANP is reservoir net pay, Ø is porosity, L is depth, ▲P is wellbore pressure drop, GOR is gas oil ratio, API is oil specific gravity, WC is water cut, μo is oil viscosity, φ is field factor, ΔT is differential temperature, WHP is wellhead pressure, and PIP is pump intake pressure. In some embodiments φ is equal to βo+S and/or φ is calculated from information obtained from multiple wells. In a specific embodiment, φ is equal to βo+S. In some embodiments, φ is calculated from information obtained from multiple wells. In some embodiments a plurality of flow rates are calculated at a plurality of well sites and the flow rates are overlaid on a map at locations corresponding to each well site location the map being displayed by the computing system. In embodiments a warning based on the flow rate is displayed to a user through a graphical user interface. In some embodiments wherein based on the flow rate, a rpm is adjusted for the pump. In embodiments, wherein based on the flow rate, a rate of water or steam injected into a wellhead is adjusted.

An embodiment of the disclosure is a computer-implemented method comprising: obtaining data related to a temperature of a pipe and a temperature of an environment surrounding the pipe; obtaining data related to well properties, fluid properties, heat transfer, and pump properties; calculating on a computer, a flow rate of fluid through the pipe using a thermodynamic equation as follows:

$$Q = \beta\left(\acute{U} * \Delta T\right)$$

wherein Q is the flow rate to be calculated; β is derived from the data related to well properties, fluid properties, heat transfer, and pump properties; ΔT is derived from a thermal photograph; and Ú is a heat transfer coefficient. In some embodiments, the data related to the temperature of the pipe is obtained from a thermal photograph, and in specific embodiments, the thermal photograph is obtained from a thermal camera. The data related to the temperature of the area surrounding the pipe can also be obtained from a thermal photograph, which can be obtained from a thermal camera. In some embodiments, the pipe is fluidly connected to a wellhead, and in some embodiments, a pump is fluidly connected to the pipe. In specific embodiments, the thermodynamic equation is further specified as $$Qo = \frac{ANP * \text{Ø}2}{L + (\blacktriangle P)} \times \frac{Gor * {}^{\circ}API * Wc}{\mu o} \times \frac{\mathring{U} * \blacktriangle T}{\varphi} \times \frac{AT * Whp}{PIP}$$

where: ANP is reservoir net pay, Ø is porosity, L is depth, ▲P is wellbore pressure drop, GOR is gas oil ratio, API is oil specific gravity, WC is water cut, μo is oil viscosity, φ is field factor, ΔT is differential temperature, WHP is wellhead pressure, and PIP is pump intake pressure. In a specific embodiment, φ is equal to βo+S. In some embodiments, φ is calculated from information obtained from multiple wells. In some embodiments a plurality of flow rates are calculated at a plurality of well sites and the flow rates are overlaid on a map at locations corresponding to each well site location the map being displayed by the computing system. In embodiments a warning based on the flow rate is displayed to a user through a graphical user interface. In some embodiments wherein based on the flow rate, a rpm is adjusted for the pump. In embodiments, wherein based on the flow rate, a rate of water or steam injected into a wellhead is adjusted.

Figure 1:
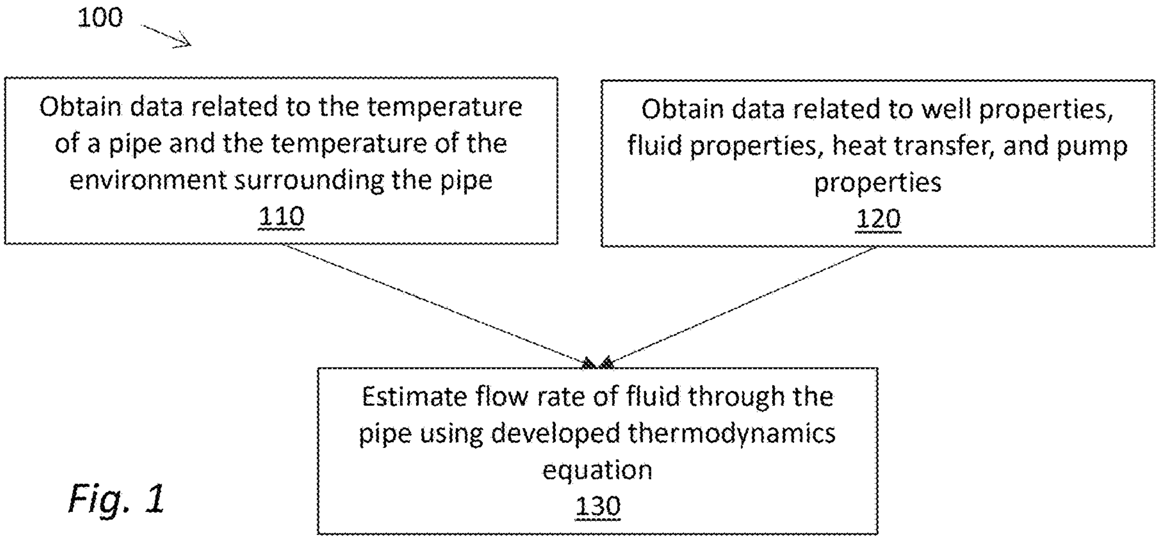
FIG. 1 is a flow chart of a method to estimate a flow rate of a fluid in a pipe in accordance with an example embodiment of the disclosure.

Figures are provided that illustrate various embodiments of systems, apparatuses, and methods of determining a flow rate of fluid through a pipe. The scope of the claims is not limited to the embodiments and figures provided with this disclosure.

DETAILED DESCRIPTION OF EXAMPLE EMBODIMENTS

TERMINOLOGY: The following terms will be used throughout the specification and will have the following meanings unless otherwise indicated.

Hydrocarbon: The terms "hydrocarbon" or "hydrocarbonaceous" or "petroleum" or "crudes" or "oil" (and variants) may be used interchangeably to refer to carbonaceous material originating from subterranean formations as well as synthetic hydrocarbon products, including organic liquids or gases, kerogen, bitumen, crude oil, natural gas or from biological processes, that is principally hydrogen and carbon, with significantly smaller amounts (if any) of heteroatoms such as nitrogen, oxygen and sulfur, and, in some cases, also containing small amounts of metals. Crude oil (e.g., liquid petroleum) and natural gas (e.g., gaseous petroleum) are both hydrocarbons.

Hydrocarbon-bearing formation/Formation/Reservoir: The terms "hydrocarbon-bearing formation" or "formation" may be used interchangeably and refer to the hydrocarbon-bearing reservoir rock matrix in which at least one wellbore (e.g., an injection wellbore or a production wellbore) is present. For example, a formation refers to a body of hydrocarbon-bearing reservoir rock that is sufficiently distinctive and continuous such that it can be mapped. It should be appreciated that while the term "formation" generally refers to geologic formations of interest, that the term "formation," as used herein, may, in some instances, include any reservoirs, geologic points, zones, or volumes of interest (such as a survey area). The term formation is not limited to any structure and configuration described herein. The term formation may be used synonymously with the term reservoir.

Wellbore/Well: The term "wellbore" refers to a single hole drilled into a hydrocarbon-bearing formation for use in hydrocarbon recovery. The wellbore can be used for injection, production, or both. The wellbore may include casing, liner, tubing, other items, or any combination thereof. Casing is typically cemented into the wellbore with the cement placed in the annulus between the formation and the outside of the casing. The wellbore may include an open hole portion or uncased portion. The wellbore is surrounded by the formation. The wellbore may be vertical, inclined, horizontal, combination trajectories, etc. The wellbore may include any completion hardware that is not discussed separately. In some embodiments, the wellbore is a gas well for production of gas from reservoirs. In some embodiments, the wellbore may be a gas well for production of gas from reservoirs that include some liquids. The term wellbore is not limited to any structure and configuration described herein. The term wellbore may be used synonymously with the terms borehole or well. For simplicity, a "production wellbore" enables the removal (i.e., production) of fluids from the formation to the surface and an "injection wellbore" enables the placement (i.e., injection) of fluid into the formation from the surface. Wellbores can have wellheads at the surface that provide pressure and structural containment. The term well may be used synonymously with the term wellbore.

Produced fluid: The term "produced fluid" refers to a fluid removed from a hydrocarbon-bearing formation via a wellbore. The produced fluid may include a brine or aqueous phase, but it may also include gas, such as a mixture of brine and gas. The produced fluid may include practically any material, liquid, gas, solid, etc. that is produced from the formation.

Equal: "Equal" refers to equal values or values within the standard of error of measuring such values. "Substantially equal" refers to an amount that is within 3% of the value recited.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. Other variants of "comprise" may be "have" and "contain" and the like. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited.

While various embodiments are described in terms of "comprising," "containing," or "including" various components or steps, the embodiments can also "consist essentially of" or "consist of" the various components and steps. "Consisting of" is closed, and excludes all additional elements. "Consisting essentially of" excludes additional material elements, but allows the inclusions of non-material elements that do not substantially change the nature of the invention.

Furthermore, as used herein, the use of the terms "a" or "an" when used in conjunction with an element may mean "one," but it is also consistent with the meaning of "one or more," "at least one," and "one or more than one." Thus, it is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the use of "may" or "may be" indicates that a modified term is appropriate, capable, or suitable for an indicated capacity, function, or usage, while taking into account that in some circumstances the modified term may sometimes not be appropriate, capable, or suitable. Furthermore, unless explicitly dictated by the language, the term "and" may be interpreted as "or" in some instances.

The term "obtaining" may include receiving, retrieving, accessing, generating, etc. or any other manner of obtaining data.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

All numbers and ranges disclosed may vary by some amount. Whenever a numerical range with a lower limit and an upper limit is disclosed, any number and any included range falling within the range is specifically disclosed.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

In this disclosure, the term “pipe” refers to practically any conduit containing fluid therein. In some embodiments, the pipe could be, but is not limited to, a production tubing, a downhole pipe (i.e., a pipe that is downhole), a surface pipe (i.e., a pipe on the surface), a flowline, a pipeline, or other pipe. In one embodiment, the pipe may contain produced fluid from a well.

Unless defined otherwise, all technical and scientific terms used herein have the same meanings as commonly understood by one of skill in the art to which the disclosed invention belongs. If there is any conflict in the usages of a word or term in this specification and one or more patent or other documents that may be incorporated herein by reference, the definitions that are consistent with this specification should be adopted. All citations referred herein are expressly incorporated by reference.

Overview

Current methods of measuring flow rate of a fluid (e.g., a produced fluid) from a well typically require equipment, such as a meter or a thermocouple, that is built into the pipe transporting the fluid or gas-liquid separator (rate estimated with the discharge number per unit time). Due to lack of equipment or supply chain issues, some wells do not have such equipment built into them when the well goes into production. Instead, large equipment (portable gas-liquid separator) is installed temporarily onto a wellhead in order to perform flow rate tests. These tests can take upwards of 6 hours to run per well before the equipment is moved to another wellhead. In some cases, wells only have flow rate measurements taken on them every six months.

The embodiments disclosed herein provide alternative methods for fluid flow rate calculations which are based on thermodynamics (relationships between heat and other forms of energy) and are not based on mass and momentum equations, which have been historically used. Fundamentally, embodiments of the disclosure use a measurement of the fluid temperature at a pipe (i.e., at the wellhead) related with other well data to estimate the fluid (e.g., produced fluid) flow rate. These embodiments differ from traditional flow rate measurement or estimation methods that require counting the number of discharges at the separator, inline two-phase flow rate instruments, the use of pipe/choke pressure drop equations or count pump stroke, or use the pump flow performance curve.

Embodiments of the disclosed method and system are an innovative way to estimate flow rate when physical equipment are not installed in the facilities. Due to restrictions and lack of equipment and spare parts, it is sometimes necessary to find ways to estimate flow rate without adding in any additional equipment. Embodiments of the disclosure include going to a wellhead and taking a thermal photograph with a thermal camera. The temperature to flow rates are correlated to each other using mathematical equations and thermal photographs resulting in a reasonable estimated flow rate.

An embodiment of the disclosure 100 is illustrated in the flow chart of FIG. 1. Data related to the temperature of a pipe and the temperature of the environment surrounding the pipe is obtained in step 110. Data related to well properties, fluid properties, heat transfer, and pump properties, as described in the calculations below, is obtained in step 120. The obtained data is used to estimate a rate of fluid (e.g., produced fluid) flowing through the pipe using Newton’s Law of Cooling.

Use

Embodiments of the disclosure can be used to estimate the flow rate of a fluid within a pipe in real time. Real time refers to taking a photograph or a temperature measurement of a pipe and having the fluid flow rate estimate performed within the next few minutes or seconds. For example, the flow rate could be determined within 10 seconds, 20 seconds, 40 seconds, 1 minute, 2 minutes, 3 minutes, 4 minutes, 5 minutes, or 10 minutes of taking the photograph. The fluid can be a gas, a liquid (oil, water or both), or a mixture of both. The fluid can comprise solids within the liquid, such as sand. In specific embodiments, the pipe is a pipe that is attached to a wellhead. Flow rate measurements can also identify tubing/pipe/valve leaks, pipe obstructions or flow patterns. The flow estimation technique can use a thermal camera to measure temperature which can be portable or physically installed close to the wellhead. In another embodiment a temperature sensor, such as a distributed temperature sensor (DTS) can be installed on the exterior of the pipe to take a temperature reading. The continuous fluid temperature (camera installed in the wellhead) reading provides the advantage of quasi real time rate estimation against a point of temperature measurement (means flow rate). In some embodiments, the system and method estimate the flow rate in pipes that have fluid moving through from a pump, such as an electrical submersible pumps, sucker rode pumps, progressive cavity pumps, etc. In embodiments, the system and method estimate the flow rate in pipes that are down hole or above the surface.

The workflow proposed provides an alternative method for estimating a fluid flow rate based on thermodynamics (relationships between heat and other forms of energy), not based on mass and momentum equations. In embodiments, the flow rate is proportional to well configuration (i.e., top of the perforations, angle, reservoir thickness), fluid properties (i.e., gas oil ratio, API, water cut and fluid viscosity), boundary conditions (i.e., well head pressure, intake pump pressure) and overall heat transfer and changes of temperature.

In embodiments, the flow rate calculation is stored and can be used as a reference value or reference rate. In some embodiments, the flow rate calculation is used to estimate reserves in a well, which can be used for artificial lift optimization (i.e., pump diagnostic, gas lift optimization) or for natural flow optimization (i.e., surface choke size optimization). In embodiments, the rpm of pumps within a well are adjusted automatically based on the flow rate values calculated. In embodiments, the amount of water and/or steam injected into a well are adjusted automatically based on the flow rate values calculated.

Embodiments of the disclosure can be used as part of the production optimization activities. In some embodiments, an infrared temperature device is installed near a pipe to measure a temperature of the pipe through which the fluid is flowing and a temperature of the environment surrounding the pipe. As used herein, the "environment surrounding the pipe" refers to the ambient air surrounding the pipe. The temperature of the environment surrounding the pipe could be measured within 1, 2, 3, 4, 5, 10, 20, or 30 meters from the pipe, for example. It should be understood that temperature measurements for pipes described herein correspond to or are closely aligned with the temperature of the fluid flowing within the pipe because the pipes are typically made of material with a high thermal conductivity. In other embodiments, the infrared temperature device is mobile and can be moved to another location to measure the fluid temperature and environment temperature near another pipe. In embodiments, the flow rate calculation can be performed at the location where the temperature is being measured or the flow rate calculation can be performed at an off-site location. Embodiments of the disclosure do not need any temperature measurement equipment installed in or on the pipe.

Embodiments of the disclosure can identify error states in the flow rate, for example by a leak or an obstruction in the pipe. In some embodiments, a warning or an error is communicated to a user when the flow rate drops by 20% in a day, for example.

Calculation of Flow Rate

In embodiments of the disclosure, the conventional rate equation (Newton's Law of Cooling) is used to estimate the amount of heat transferred through a pipeline (Equation 1).

$$q = \mathring{U} A \left(T_{fluid} - T_{environment}\right) \qquad \text{Equation 1}$$

Where:
q=heat transferred
A=area of the surface
Ů=heat transfer coefficient of the pipe
$T_{fluid}$=fluid temperature (can be measured with a thermocouple or infrared camera)
$T_{environment}$=environmental temperature Equation 1 was used as starting point to develop a new equation using thermodynamics to estimate flow rate.

$$Q = \beta\left(\acute{U} * \Delta T\right) \qquad \text{Equation 2}$$

where $$\beta = f(Wc, RGP, \mu, API, PIP, L, WHP, A, \phi, S, ANP, Bo)$$

and Q=flow rate.

This Equation 2 includes information related to the fluid properties, the reservoir properties, the artificial lift method and the amount of heat transferred. This leads to Equation 3, which is referred to herein as the developed thermodynamics equation because it is developed using thermodynamics in combination with other properties.

$$Qo = \frac{ANP * \phi 2}{L + (\blacktriangle P)} \times \frac{Gor * {}^{\circ}API * Wc}{\mu o} \times \frac{\mathring{U} * \blacktriangle T}{\omega} \times \frac{AT * Whp}{PIP} \qquad \text{Equation 3}$$

Where:
ANP=reservoir net pay
Ø=porosity
L=depth of the well
▲P=wellbore pressure drop
GOR=gas oil ratio
API=oil specific gravity
WC=water cut
μo=oil viscosity
ω=field factor
AT=differential temperature
WHP=wellhead pressure
PIP=pump intake pressure
Bo=formation volume factor
$Q_O$=oil rate The first divisional part of Equation 3 is based on well properties, the second is based on fluid properties, the third on heat transfer, and the fourth on the pump properties. That is, well properties can include ANP, Ø, ▲P, and L. Fluid properties can include GOR, API, WC, and μo. Heat transfer properties can include ω, ▲T, and Ů. Pump properties can include AT, WHP, and PIP. Bo can be estimated from PVT lab reports, PIP can be estimated from liquid levels, and water cut can be estimated from prior well tests.

Historically, temperature measurements have been used to provide a rough estimation of the well operation conditions, i.e., low temperature=flow rate is low, high temperature=flow rate is high. However, the developed thermodynamics equation of the present disclosure correlates temperature data to fluid flow with better accuracy. The flowrate is inferred based on the analysis of all the variables at the well and/or field level. This enables more well tests per well per time period. In embodiments of the disclosure the temperature is measured at a well head.

Field Factor ω

A dimensionless factor, ω, is used to scale the equation to a specific application, for example, calculating the flow rate on individual wells within a field of wells. For example, ω may be calculated and calibrated per field, per group of wells, or per groups of wells. In embodiments, the calibration of ω is done periodically or the calibration can be done when new data comes in from the underlying wells and/or fields. ω represents the magnitude of error in the system and can be adjusted by field. In embodiments, ω is calculated from prior tests based on production data. In embodiments of the disclosure, ω is equal to βo+S where βo is the formation volume factor and S is the skin (estimate of wellbore damage). In one embodiment, ω is a constant parameter.

Figure 2:
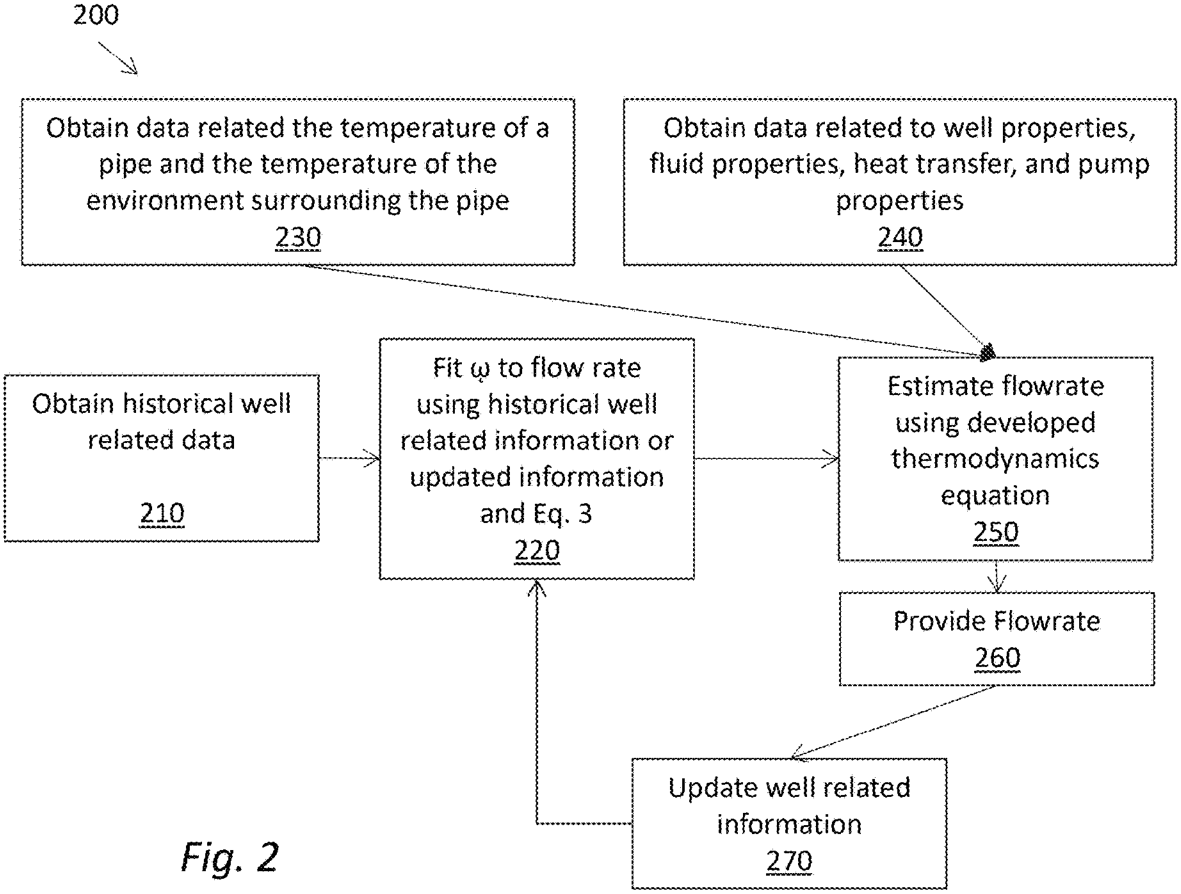
FIG. 2 is a flow chart of a second method to estimate a flow rate of a fluid in a pipe in accordance with an example embodiment of the disclosure.

Another embodiment of the disclosure 200 is illustrated in the flow chart of FIG. 2. Historical well related data is obtained in step 210. The historical well related data can comprise well properties, fluid properties, heat transfer, and pump properties, for example. ω is fit to flow rate using the obtained historical well related data in step 220. Data related to the temperature of a pipe and the temperature of the environment surrounding the pipe is obtained in step 230. The temperature data could be obtained from a thermal photograph, for example. Data related to well properties, fluid properties, heat transfer, and pump properties, as described previously, are obtained in step 240. All of the data obtained is used to estimate the flow rate of the produced fluid in step 250. The flow rate is estimated using the developed thermodynamics equation (Equation 3 above), which is based upon Newton's Law of Cooling. The flow rate is produced in step 260. As well related data is updated, ω can be refit to the data in step 220.

In example embodiments, a computer system comprises: a processor; a memory; and a flow rate estimation algorithm stored in the memory and configured to execute a flow rate estimation model on the processor. The flow rate estimation model comprises: a first input node configured to obtain data related to a temperature of a pipe and a temperature of an environment surrounding the pipe; a second input node configured to obtain data related to well properties, fluid properties, heat transfer, and pump properties; a calculation node configured to calculate a flow rate value of fluid through the pipe using a thermodynamic equation as follows:

$$Q = \beta\left(\acute{U} * \Delta T\right)$$

wherein Q is the flow rate to be calculated; β is derived from the data related to well properties, fluid properties, heat transfer, and pump properties; ΔT is derived from a thermal photograph; and Ú is a heat transfer coefficient; and, an output node configured to provide the flow rate value. In embodiments, the first input node is configured to parse a thermal photograph and return the temperature of the pipe and the temperature of the environment surrounding the pipe. In some embodiments, the data related to the temperature of the pipe is obtained from a thermal photograph and in specific embodiments, the thermal photograph is obtained from a thermal camera. In some embodiments, the data related to the temperature of the area surrounding the pipe is obtained from a thermal photograph. In some embodiments, the pipe is fluidly connected to a wellhead and in some embodiments a pump is fluidly connected to the pipe. In a specific embodiment, the thermodynamic equation is further specified as $$Qo = \frac{ANP * \emptyset 2}{L + (\blacktriangle P)} \times \frac{Gor * {}^{\circ}API * Wc}{\mu o} \times \frac{\mathring{U} * \blacktriangle T}{\underset{\cdot}{\omega}} \times \frac{AT * Whp}{PIP}$$

where: ANP is reservoir net pay, Ø is porosity, L is depth, ▲P is wellbore pressure drop, GOR is gas oil ratio, API is oil specific gravity, WC is water cut, μo is oil viscosity, ῳ is field factor, AT is differential temperature, WHP is wellhead pressure, and PIP is pump intake pressure. In some embodiments ῳ is equal to βo+S and/or ῳ is calculated from information obtained from multiple wells.

In embodiments, the w field factor is calculated by applying artificial intelligence algorithms in real time to well data. Changes in fluid properties, well and artificial lift operational conditions will refresh the w field factor allowing continuous adjustment over time with the purpose of improve accuracy in flow rate calculations. In embodiments, artificial intelligence is implemented with generic or well-known algorithms. In embodiments, artificial intelligence calculates w for each individual well, for a group of wells, and/or for a field of wells. In some embodiments, the artificial intelligence program will determine at what scale to calculate the w factor. In embodiments, the artificial intelligence program is a machine learning program. In embodiments, the machine learning program is trained to determine w as a function of flow rate and temperature.

Thermal Photographs

Embodiments of the disclosure calculate the temperatures of a pipe and the environment around the pipe. In embodiments, a camera that can sense the levels of heat is used to take a picture of the pipe and the environment around the pipe. The camera can be a thermal camera or an infrared camera. As used herein, a thermal camera encompasses both a thermal camera and an infrared camera.

In certain embodiments of the disclosure, a thermal camera is used to take a photograph of the pipe within the surrounding environment. In embodiments, the thermal camera records the minimum, maximum, and/or average temperature of a point on the pipe. In embodiments, the thermal camera records the minimum, maximum, and/or average temperature of a point within the environment (air) surrounding the pipe. A thermal photograph, as used herein, refers to any photograph that contains additional information on the temperatures within the photograph. Different colors in thermal photographs relate to different values of temperature and also are correlated to the type of fluid. Yellow or lighter gray in a grayscale photograph correlates to liquid flow, while purple or darker gray correlates to gas flow.

Computer Systems

In certain embodiments, some or all of the processing operations described in connection with the foregoing methods can be performed by computing systems such as a personal computer, a desktop computer, a centralized computer, a distributed computing system, a tablet, a mobile device such as a mobile telephone device, or cloud computing systems. In embodiments, the pipe is remotely monitored. As explained previously, certain operations of the foregoing methods can be performed by a combination of computing systems.

Figure 3:
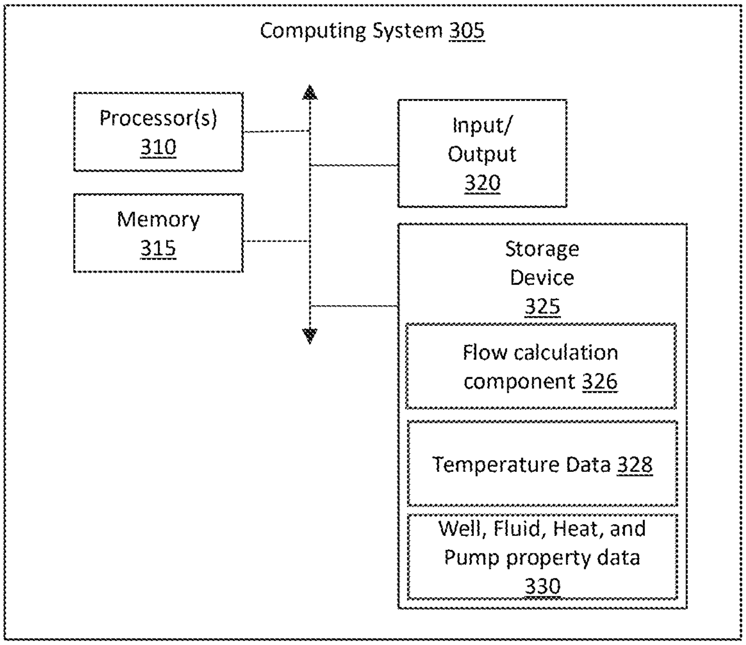
FIG. 3 is a block diagram of an example computer system.

Referring to FIG. 3, an example of a computing system is illustrated. The computing system 305 can represent a component of or one of a computing system which can be used to estimate flow rate, including the computing systems on mobile devices from which a thermal photograph can be taken or a remote computer system that obtains a thermal photograph or other such data from a camera located proximate to a source that is a distance away from the remote computer system. Computing system 305 includes a processor 310, a memory 315, an input/output device 320, and a storage device 325. Each of the components of the computing system 305 can be interconnected, for example, by a system bus. The components of computing system 305 shown in FIG. 3 are not exhaustive, and in some embodiments, one or more of the components shown in FIG. 3 may not be included in an example system. Further, one or more components shown in FIG. 3 can be rearranged. The components of the system do not need to be physically located close to each other, for example, a cloud based computing system could be used.

The processor 310 can be one or more hardware processors and can execute computer-readable instructions, such as instructions stored in memory 315. The processor 310 can be an integrated circuit, a central processing unit, a multi-core processing chip, an SoC, a multi-chip module including multiple multi-core processing chips, or other hardware processor in one or more example embodiments. The hardware processor is known by other names, including but not limited to a computer processor, a microprocessor, and a multi-core processor.

The memory 315 can store information including computer-readable instructions and data associated with the flow calculations. The memory 315 can be cache memory, a main memory, and/or any other suitable type of memory. The memory 315 is a non-transitory computer-readable medium. In some cases, the memory 315 can be a volatile memory device, while in other cases the memory can be a non-volatile memory device.

The storage device 325 can be a non-transitory computer-readable medium that provides large capacity storage for the computing system 305. The storage device 325 can be a disk drive, a flash drive, a solid state device, or some other type of storage device. In some cases, the storage device 325 can be a database that is remote from the computing system 305. The storage device can store operating system data, file data, database data, algorithms, and software modules, as examples. The algorithms stored in the storage device can embody the operations of the methods described herein. In embodiments, the storage device 325 can comprise a flow calculation component 326, temperature data 328, and well, fluid, heat, and pump property data 330. The temperature data 328 and well, fluid, heat, and pump property data may have been received from the input/output 320. The temperature data may comprise a thermal photograph or can comprise actual temperature measurements taken from a thermal photograph, for example. The flow calculation component can comprise algorithms that include a thermodynamic equation using temperature data and well, fluid, heat, and pump property data to estimate a flow rate. The flow calculation component 326, temperature data 328, and well, fluid, heat, and pump property data can be transferred to the processor 310 and the processor 310 can implement the calculation in order to return an estimated flow rate to the input/output 320 or to the storage device 325, for example.

Lastly, the input/output device 320 provides an interface to other devices, such as a touch screen interface, and other computing systems such as a remote computing system. The input/output device 320 can provide signal transfer links for communications with other devices and computing systems. The signal transfer links can include wired and/or wireless signal transfer links that transmit and receive communications via known communication protocols. In some instances, the input/output device 320 can include a wired or wireless network interface device. A visual representation of the calculated flow rate of the fluid may be output to a user via a graphical user interface to a screen. In embodiments, the calculated flow rates of individual wells via the wellhead can be overlaid on a map at each location. In embodiments the computer system can trigger an error or warning if the flow rate deviates from a predetermined flow rate.

Other modifications are also possible. The instant disclosure may even be claimed in terms of a program product with a non-transitory computer readable medium.

Example 1

Wells were simulated using a systems analysis program. Validated data was loaded into the simulator to perform nodal analysis and determine the production behavior of an area under study. A surface network was designed using multiphase system optimization and the wells associated with a station were created, thus fulfilling the cycle of collection of crude oil in the system. A production emulation of a flow station was performed. An integrated production model was created but it required a production test to keep the model validated with updated calibration of the model. A mathematical model was developed from this production model using Newton's Law of Cooling to estimate flow rate. The equations developed from this simulation are Eq. 2 and Eq. 3.

Example 2

Figure 4:
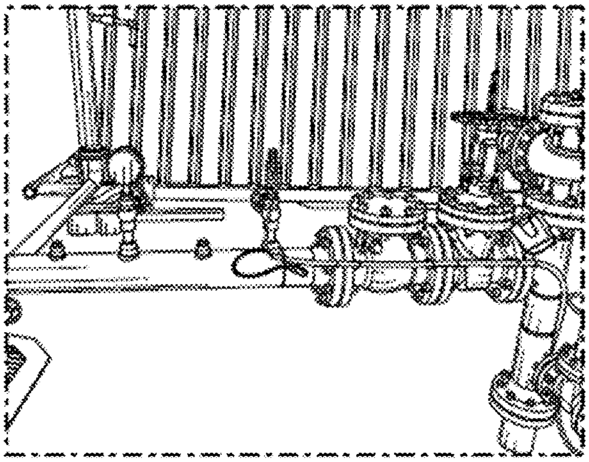
FIG. 4 is an example of a photograph of a first flowline (from wellhead to the flow station).
Figure 5:
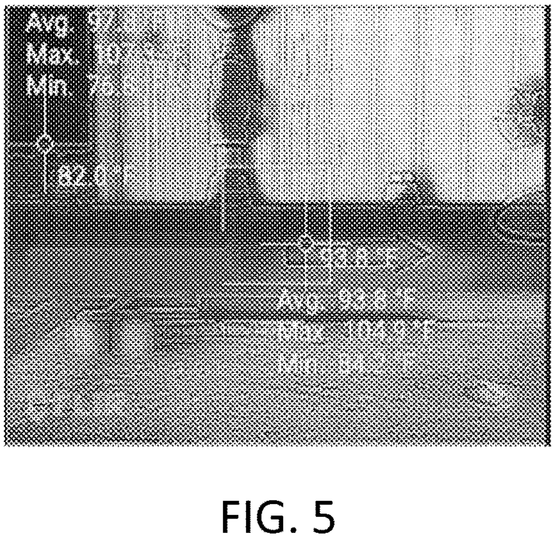
FIG. 5 is an example of a thermal photograph of the flowline from FIG. 4.

FIG. 4 is a photograph of a pipe above the surface of the earth taken with a normal camera. FIG. 5 is a photograph of the pipe of FIG. 4 taken with a thermal imaging camera. FIG. 5 shows that along the horizontal portion of the pipe, the top is dark gray (indicating a gas) and the bottom is lighter gray (indicating a liquid). The average temperature of the pipe was 93.8° F., the maximum 104.9, and the minimum 84.2. The barrels per day was estimated with temperatures given in the thermal photograph using Equation 3, and was 195 BPD. The pipe photographed was a pipe which contained produced fluids from a well.

Figure 6:
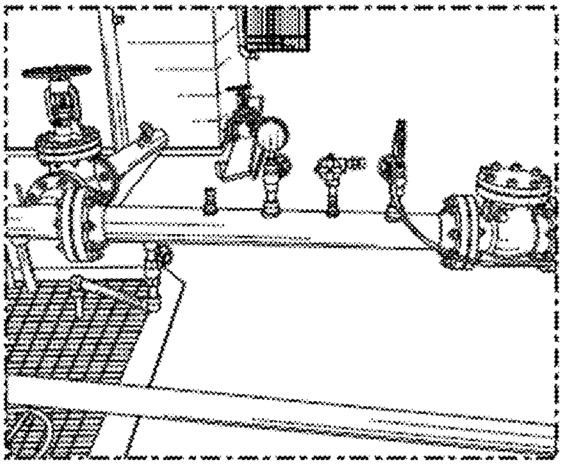
FIG. 6 is an example of a photograph of a second flowline.
Figure 7:
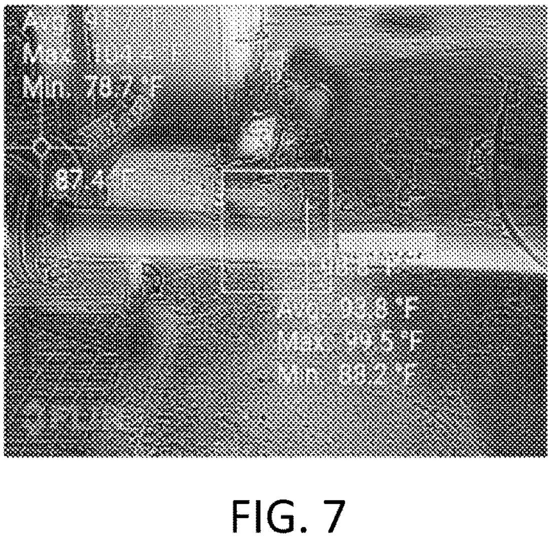
FIG. 7 is an example of a thermal photograph of the flowline from FIG. 6.

FIG. 6 is a photograph of a pipe above the surface of the earth taken with a normal camera. FIG. 7 is a photograph of the pipe of FIG. 6 taken with a thermal imaging camera. The photograph shows that along the horizontal portion of the pipe, most of the pipe is lighter grey (indicating a liquid). The average temperature of the pipe was 93.8° F., the maximum 99.5, and the minimum 88.2. The barrels per day was estimated with temperatures given in the thermal photograph using Equation 3, and was 248 BPD. The pipe photographed was a pipe which contained produced fluids from a well.

Figure 8:
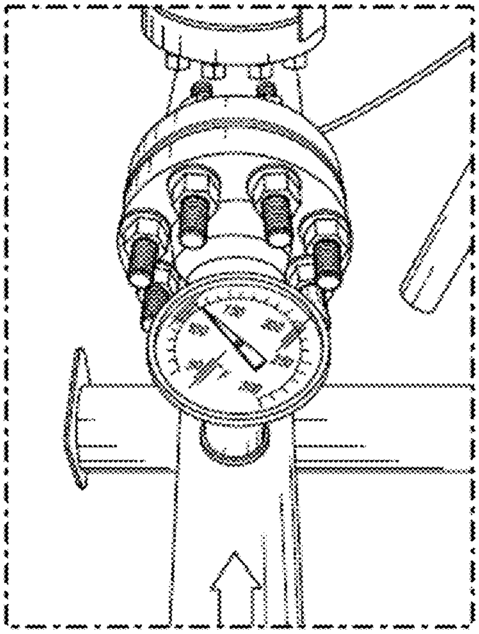
FIG. 8 is an example of a photograph of a third flowline.
Figure 9:
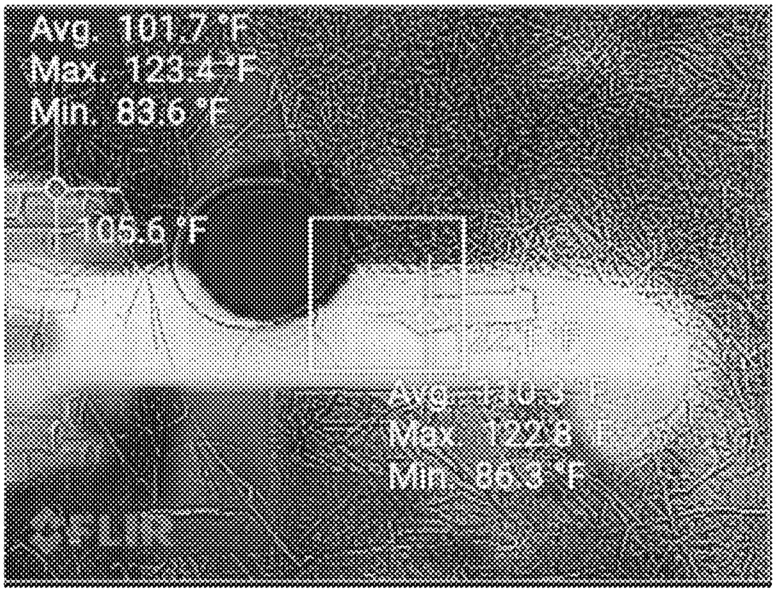
FIG. 9 is an example of a thermal photograph of the flowline from FIG. 8.

FIG. 8 is a photograph of a pipe above the surface of the earth taken with a normal camera. FIG. 9 is a photograph of the pipe of FIG. 8 taken with a thermal imaging camera. The photograph shows that along the horizontal portion of the pipe, most of the pipe is very light grey (indicating a liquid). The average temperature of the pipe was 110.3° F., the maximum 122.85, and the minimum 86.3. The pipe photographed in FIGS. 8 and 9 was a pipe which contained 100% water to be injected into a well.

Example 3

The workflow was tested at the field level in wells with multiple operational conditions (i.e., GOR, water cut, pump frequency, depth) and results showed absolute error less than 5% compared with traditional oil flow rate measurement methods.

Thermal pictures of 10 different above ground production pipes were taken and the BPD were calculated using Equation 3. Table 1 lists measured flow rates (Qo Vm) and the calculated flow rates (Qo r) using Equation 3 for each above ground production pipe with percent error. In most cases the amount of error was less than 10% with the average error being 5.0%.

TABLE 1

| Well | % Error | Qo Vm | Qo r | % Certainty |
|---|---|---|---|---|
| 1 | 6.7 | 910 | 879 | 86 |
| 2 | 5.6 | 670 | 671 | 100 |
| 3 | 2.9 | 161 | 155 | 100 |
| 4 | 5.8 | 487 | 506 | 10 |
| 5 | 3.8 | 1094 | 975 | 10 |
| 6 | 12.3 | 1696 | 1897 | 89 |
| 7 | 2.7 | 532 | 532 | 100 |
| 8 | 0.9 | 252 | 249 | 100 |
| 9 | 6 | 1028 | 1041 | 100 |
| 10 | 3.69 | 910 | 903 | 100 |
| total | 5 | 7740 | 7808 | 97.5 |
| total c | 4.25 | 7161 | 7255 | — |

The description and illustration of one or more embodiments provided in this application are not intended to limit or restrict the scope of the invention as claimed in any way. The embodiments, examples, and details provided in this disclosure are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope. For instance, such other examples are intended to be within the scope of the claims if they have structural or methodological elements that do not differ from the literal language of the claims, or if they include equivalent structural or methodological elements with insubstantial differences from the literal languages of the claims, etc. All citations referred herein are expressly incorporated herein by reference.

We claim:

1. A method of estimating a flow rate of a fluid in a pipe, the method comprising:

obtaining data related to a temperature of the pipe and a temperature of an environment surrounding the pipe;

obtaining data related to well properties, fluid properties, heat transfer, and pump properties;

calculating, by a flow calculation component executing on a computing system, the flow rate of the fluid through the pipe using a thermodynamic equation as follows:

$$Qo = \frac{ANP * \text{Ø}2}{L + (\blacktriangle P)} \times \frac{Gor * {}^{\circ}API * Wc}{\mu o} \times \frac{\mathring{U} * \blacktriangle T}{\omega} \times \frac{AT * Whp}{PIP}$$

where: ANP is reservoir net pay, Ø2 is porosity, L is depth, ▲P is wellbore pressure drop, Gor is gas oil ratio, °API is oil specific gravity, Wc is water cut, μo is oil viscosity, $\mathring{U}$ is the heat transfer coefficient, ▲T is derived from the data related to the temperature of the pipe and the temperature of the environment surrounding the pipe, ω is field factor, AT is differential temperature, Whp is wellhead pressure, and PIP is pump intake pressure; and responsive to calculating the flow rate of the fluid through the pipe, facilitating at least one of the following operations:

displaying on a graphical user interface a warning based on the flow rate;

adjusting a pump based on the flow rate;

adjusting a surface choke based on the flow rate; and adjusting a rate at which a fluid is injected into a wellhead.

2. The method of claim 1, wherein the data related to the temperature of the pipe is obtained from a thermal photograph or a temperature monitor attached to the outside of the pipe.

3. The method of claim 2, wherein the thermal photograph is obtained from a thermal camera and wherein the data related to the temperature of the environment surrounding the pipe is obtained from the thermal photograph.

4. The method of claim 1, wherein the pipe is fluidly connected to the wellhead and the pump is fluidly connected to the pipe.

5. The method of claim 1, wherein ω is equal to βo+S and wherein ω is calculated from information obtained from multiple wells.

6. The method of claim 1, wherein a plurality of flow rates is calculated using the thermodynamic equation at a plurality of well sites and the flow rates are overlaid on a map at locations corresponding to each well site location on the map being displayed by the computing system.

7. A computer system comprising:

a processor;

a memory; and a flow rate estimation algorithm stored in the memory and configured to execute a flow rate estimation model on the processor, the flow rate estimation model comprising:

a first input node configured to obtain data related to a temperature of a pipe and a temperature of an environment surrounding the pipe;

a second input node configured to obtain data related to well properties, fluid properties, heat transfer, and pump properties;

a calculation node configured to calculate a flow rate value of fluid through the pipe using a thermodynamic equation as follows:

$$Qo = \frac{ANP * \text{Ø}2}{L + (\blacktriangle P)} \times \frac{Gor * {}^{\circ}API * Wc}{\mu o} \times \frac{\mathring{U} * \blacktriangle T}{\omega} \times \frac{AT * Whp}{PIP}$$

where: ANP is reservoir net pay, Ø2 is porosity, L is depth, ▲P is wellbore pressure drop, Gor is gas oil ratio, °API is oil specific gravity, Wc is water cut, μo is oil viscosity, $\mathring{U}$ is the heat transfer coefficient, ▲T is derived from the data related to the temperature of the pipe and the temperature of the environment surrounding the pipe, ω is field factor, AT is differential temperature, Whp is wellhead pressure, and PIP is pump intake pressure; and, an output node configured to provide the flow rate value and facilitate at least one of the following operations responsive thereto:

displaying on a graphical user interface a warning based on the flow rate;

adjusting a pump based on the flow rate;

adjusting a surface choke based on the flow rate; and adjusting a rate at which a fluid is injected into a wellhead.

8. The computer system of claim 7, wherein the first input node is configured to parse a thermal photograph and return the temperature of the pipe and the temperature of the environment surrounding the pipe.

9. The computer system of claim 7, wherein the data related to the temperature of the pipe is obtained from a thermal photograph and the data related to the temperature of the area surrounding the pipe is obtained from a thermal photograph.

10. The computer system of claim 9, wherein the thermal photograph is obtained from a thermal camera.

11. The computer system of claim 7, wherein the pipe is fluidly connected to the wellhead and the pump is fluidly connected to the pipe.

12. The computer system of claim 7, wherein ω is equal to βo+S wherein ω is calculated from information obtained from multiple wells.

13. The computer system of claim 7, wherein a plurality of flow rate values is calculated using the thermodynamic equation at a plurality of well sites and the flow rate values are overlaid on a map at locations corresponding to each well site location by the output node.

* * * * *